(12) United States Patent
Vanblaere

(10) Patent No.: US 8,359,749 B2
(45) Date of Patent: Jan. 29, 2013

(54) METHOD FOR MANUFACTURING REFERENCE PRESSURE CHAMBER

(75) Inventor: Roland Frans Cyrille Cornelius Vanblaere, Houthalfen Helchteren (BE)

(73) Assignee: I.P.S. Research and Development B.V., Vlijmen (NL)

( * ) Notice: Subject to any disclaimer, the term of this patent is extended or adjusted under 35 U.S.C. 154(b) by 914 days.

(21) Appl. No.: 11/574,487

(22) PCT Filed: Aug. 30, 2004

(86) PCT No.: PCT/IB2004/002832
§ 371 (c)(1),
(2), (4) Date: Oct. 2, 2008

(87) PCT Pub. No.: WO2006/024891
PCT Pub. Date: Mar. 9, 2006

(65) Prior Publication Data
US 2011/0100474 A1   May 5, 2011

(51) Int. Cl.
*B21D 51/16* (2006.01)
(52) U.S. Cl. .................. 29/890.124; 29/890.12
(58) Field of Classification Search ............... 29/890.12, 29/890.124; 222/399, 389, 396, 61, 402.16, 222/635, 55; 141/3, 18, 20, 39, 47, 49, 51, 141/64, 113
See application file for complete search history.

(56) References Cited

U.S. PATENT DOCUMENTS

| | | | |
|---|---|---|---|
| 3,327,322 A * | 6/1967 | Norton | 623/3.23 |
| 3,769,788 A * | 11/1973 | Korper, III | 60/327 |
| 4,040,600 A | 8/1977 | Coppola et al. | |
| 4,056,043 A * | 11/1977 | Sriramamurty et al. | 92/13.2 |
| 4,167,236 A * | 9/1979 | Taubenmann | 222/135 |

(Continued)

FOREIGN PATENT DOCUMENTS

| | | |
|---|---|---|
| EP | 0349 053 A | 1/1990 |
| NL | 1022455 C2 | 7/2004 |

(Continued)

OTHER PUBLICATIONS

International Search Report issued in PCT/IB2004/002832.

*Primary Examiner* — David Bryant
*Assistant Examiner* — Ryan J Walters
(74) *Attorney, Agent, or Firm* — Fish & Richardson P.C.

(57) ABSTRACT

A method for at least providing at least a first and a second assembly for manufacturing, respectively, a first reference pressure chamber (1A) which in use in a pressure control device encloses a gas such that the gas is held under a first reference pressure, and a second reference pressure chamber (1B) which in use in a pressure control device encloses a gas such that the gas is held under a second reference pressure, wherein the first reference pressure differs from the second reference pressure, and wherein the pressure control device is suitable for feeding through, on the basis of the reference pressure, a fluid from a first space (I) in which a relatively high pressure prevails to a second space (II) in which a relatively low pressure prevails, the method comprising providing the first and the second assembly such that each assembly for forming the respective reference pressure chamber comprises a casing (3A, 3B) and a plunger part (11A, 11B), while the casing is closed at a first end and the plunger part can at least partly connect with the casing in or adjacent a second end of the casing and is then movable relative to the casing.

17 Claims, 6 Drawing Sheets

U.S. PATENT DOCUMENTS

Figure 1C:
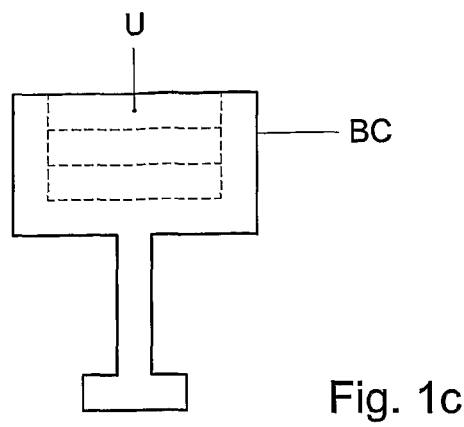

| | | | |
|---|---|---|---|
| 4,909,488 A * | 3/1990 | Seibert et al. | 267/64.11 |
| 5,632,466 A | 5/1997 | Ochs | |
| 6,079,959 A * | 6/2000 | Kingsford et al. | 417/393 |
| 6,130,694 A * | 10/2000 | Beatty | 347/85 |
| 7,721,919 B2 * | 5/2010 | Vanblaere et al. | 222/399 |
| 2002/0179151 A1 * | 12/2002 | van't Hoff | 137/505.41 |
| 2003/0121938 A1 * | 7/2003 | Soudan | 222/145.1 |
| 2006/0054237 A1 | 3/2006 | Vanblaere et al. | |

FOREIGN PATENT DOCUMENTS

| | | |
|---|---|---|
| WO | WO 93/22222 A | 11/1993 |
| WO | WO 99/62791 A | 12/1999 |
| WO | WO 2004065260 A1 * | 8/2004 |

* cited by examiner

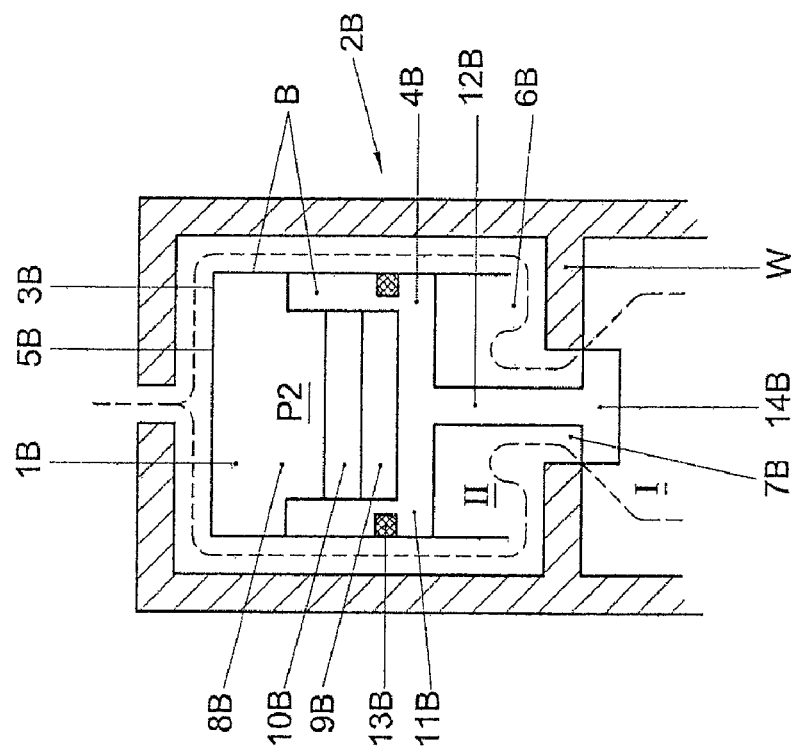
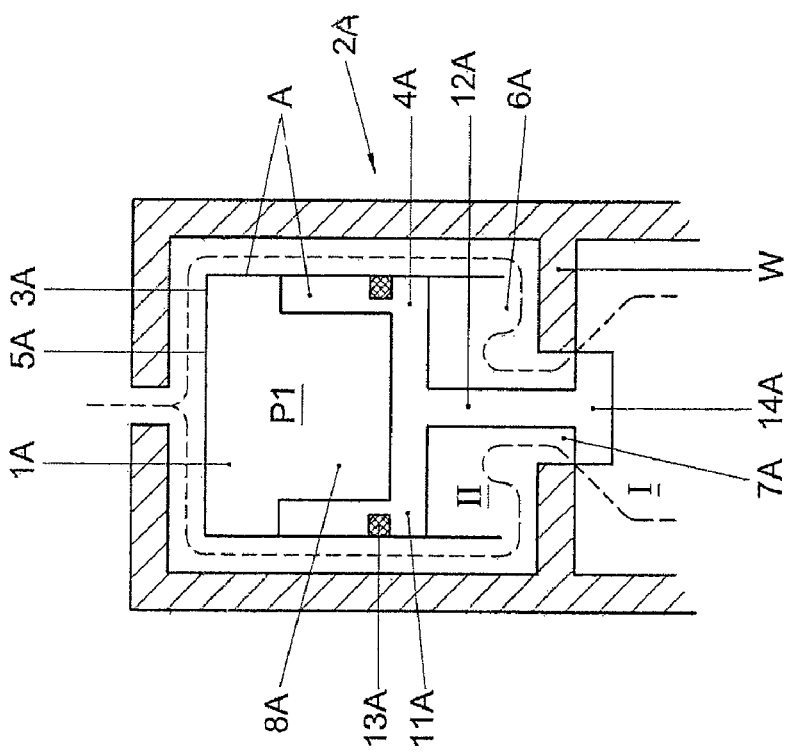
Fig. 1a
Fig. 1b

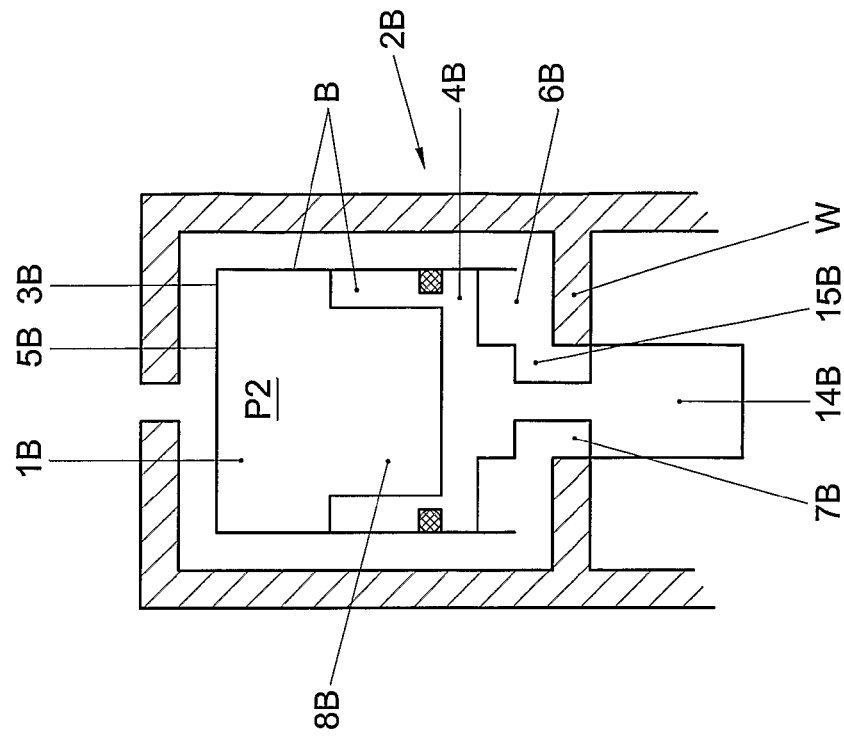
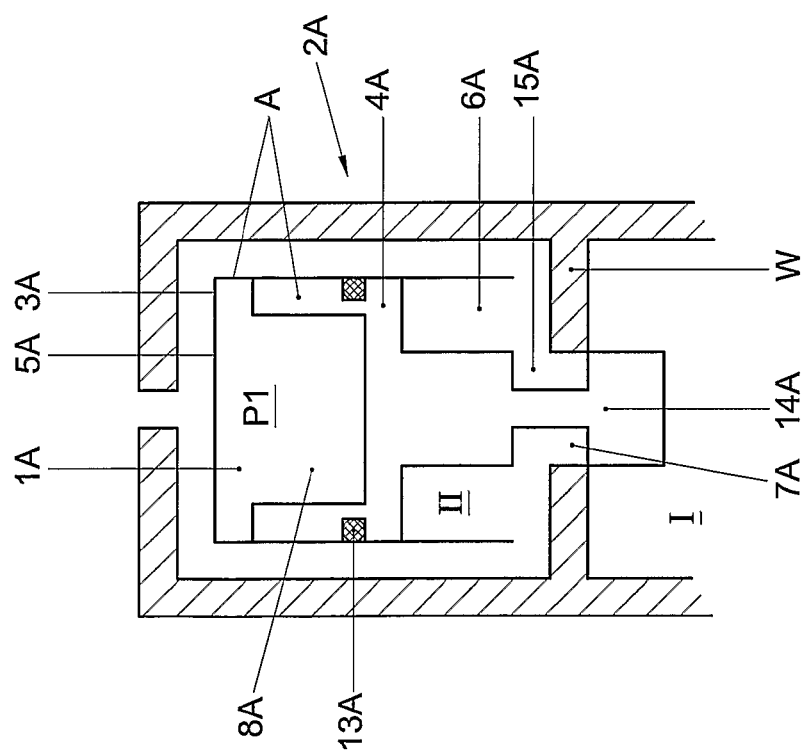
Fig. 2a
Fig. 2b

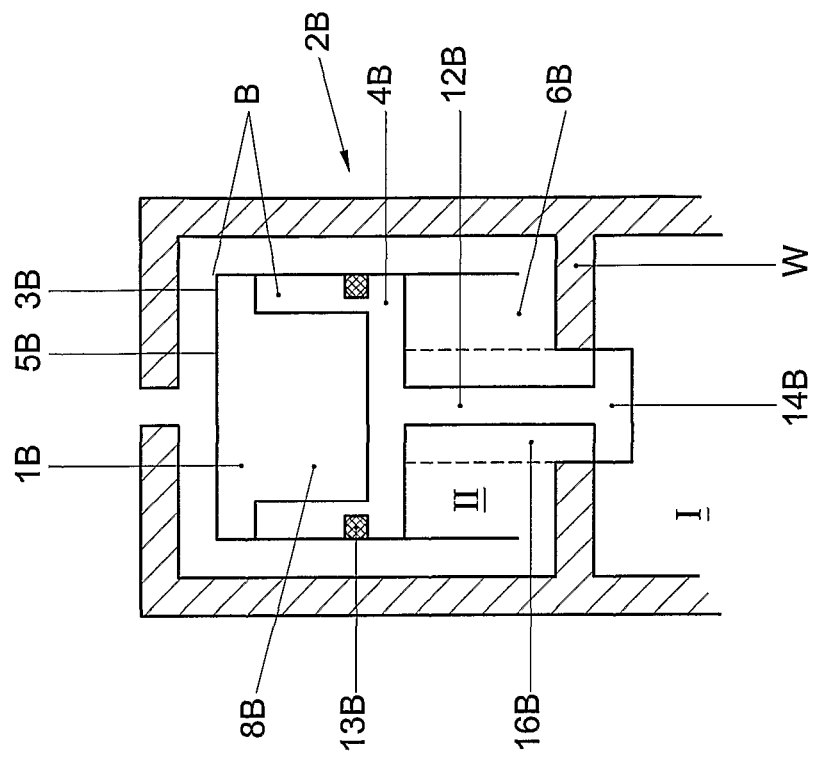
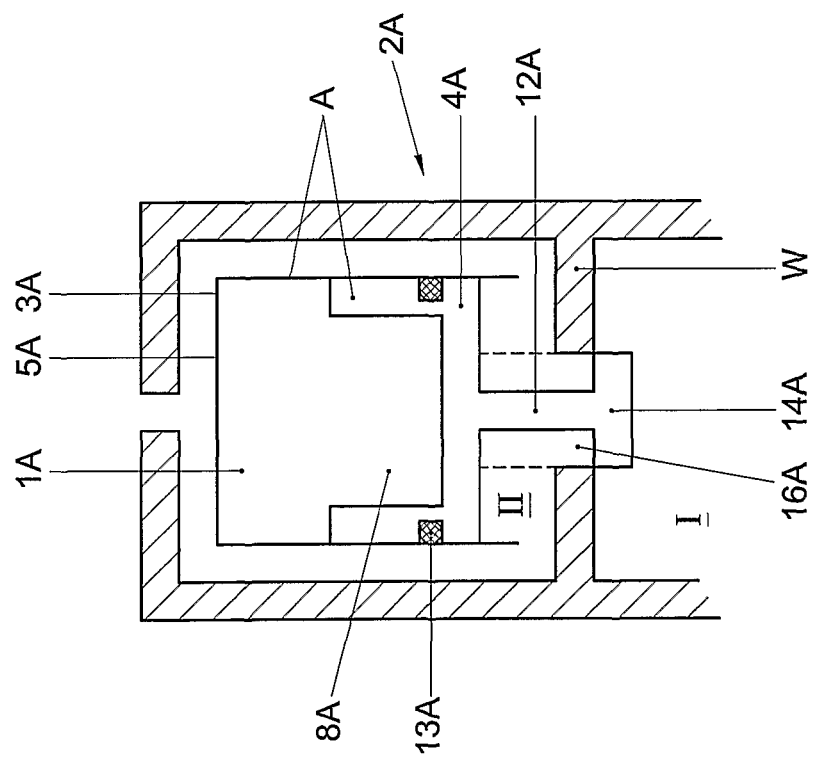
Fig. 3a
Fig. 3b

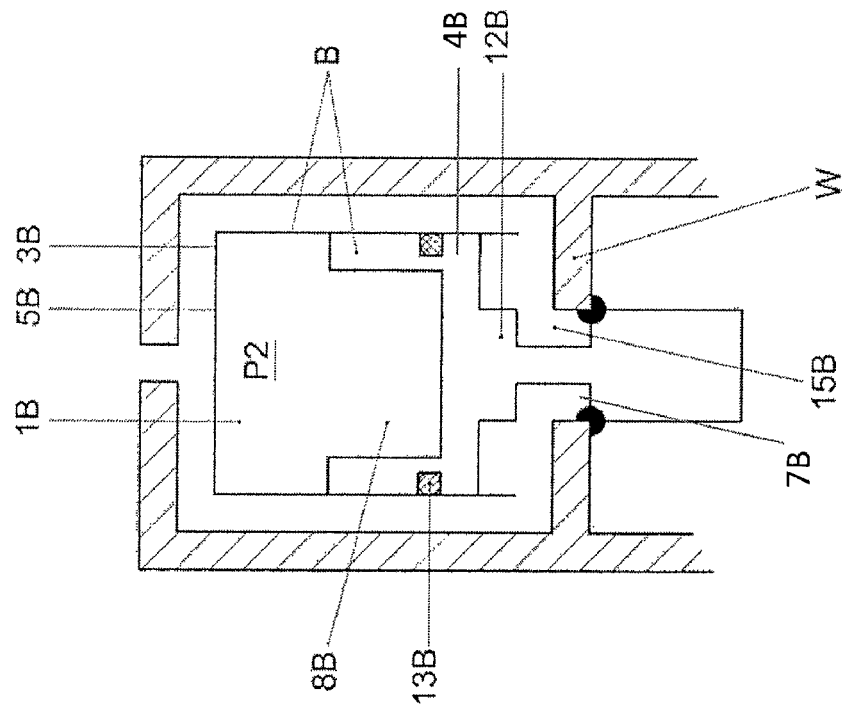
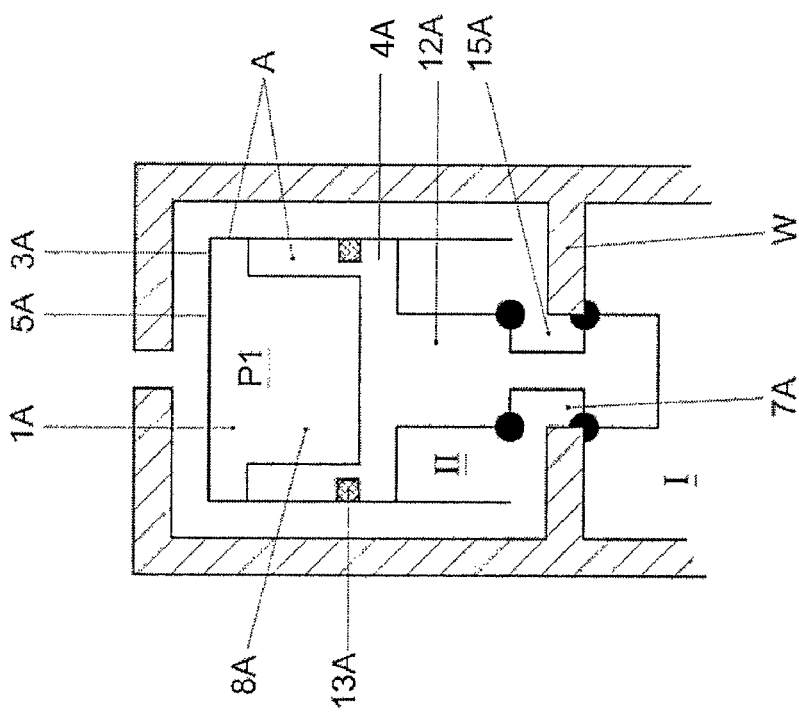
Fig. 4b
Fig. 4a

METHOD FOR MANUFACTURING REFERENCE PRESSURE CHAMBER

CROSS-REFERENCE TO RELATED APPLICATIONS

This application is a Continuation of International Application No. PCT/IB2004/002832, filed Aug. 30, 2004, which published in English as International Publication No. WO 2006/024891 under Patent Cooperation Treaty (PCT) Article 21(2).

The invention relates to a method for at least providing at least a first and a second assembly for manufacturing, respectively, a first reference pressure chamber which in use in a pressure control device encloses a gas such that the gas is held under a first reference pressure, and a second reference pressure chamber which in use in a pressure control device encloses a gas such that the gas is held under a second reference pressure, wherein the first reference pressure differs from the second reference pressure, and wherein the pressure control device to be used is suitable for feeding through, on the basis of the reference pressure, a fluid from a first space in which a relatively high pressure prevails to a second space in which a relatively low pressure prevails, the method comprising:

providing the first and the second assembly, such that each assembly for forming the respective reference pressure chamber comprises a casing and a plunger part, while the casing is closed at a first end and the plunger part can at least partly connect with the casing in or adjacent a second end of the casing and is then movable relative to the casing.

The above-described first and second reference pressure chamber each belong to a type of reference pressure chamber which may be included in a pressure control device for controlling, on the basis of the reference pressure, the pressure at which a fluid can be fed through from a first space in which a relatively high pressure prevails to a second space in which a relatively low pressure prevails. The first space can for instance be a storage for propellant or a space in which a product is stored which is to be released by means of spraying. The first space can also be a pipe section situated upstream of the pressure control device. The second space can for instance be a space in which the propellant is to take a pressure with which a product to be driven out of the second space or other space by means of the propellant can be expelled. The second space can also be a so-called release channel of, for instance, an aerosol can. It is also possible for the second space to comprise a pipe section situated downstream of the pressure control device.

Generally, when in such pressure control devices in the second space a pressure prevails that is lower than the reference pressure prevailing in the reference pressure chamber, the plunger part is moved away from the first end of the casing, so that a passage between the first and the second space is cleared to allow the fluid to flow from the first space to the second space. When the pressure in the second space is higher than the reference pressure in the reference pressure chamber, the plunger part is moved in the direction of the first end of the casing, and the passage between the first and the second space is closed.

It will be clear that reference pressure to be provided in the reference pressure chamber is highly determinative of the pressure control device's functioning as desired. Providing the reference pressure in the reference pressure chamber can be done, for instance, by forming a respective reference pressure chamber by connecting the plunger part to the casing, opening a closable opening present in the casing, and then adding gas through this opening until a reference pressure desired in the reference pressure chamber has been reached. A disadvantage of such a method is that when the closable opening is being closed, gas might still flow out of the reference pressure chamber, so that once the reference pressure chamber has been closed through closure of the closable opening, the reference pressure is lower than desired.

It is also possible to assemble the reference pressure chamber and the pressure control device in a gas having an ambient pressure which is equal to the reference pressure to be obtained in the reference pressure chamber. This requires a laborious and costly method, which is likewise undesirable.

A method for providing an assembly for manufacturing a reference pressure chamber is known per se from WO 93/22222. In this known method, the reference pressure chamber is formed in a gas of atmospheric pressure, and the plunger part and the casing are so dimensioned that when in use the plunger part has reached a position with respect to the casing where the desired reference pressure prevails in the reference pressure chamber formed, the plunger part has reached such a position with respect to the casing that in use a passage between a high pressure space and a low pressure space is closed.

In WO 93/22222, it is also indicated that it is possible for the casing alone to be so dimensioned that in use the desired reference pressure in the reference pressure chamber is achieved when the plunger part has taken a position relative to the casing in which the passage is closed off. A problem is that when the casing alone is dimensioned for the purpose of realizing a desired reference pressure in the reference pressure chamber, the dimensions of the reference pressure chamber become dependent on the desired reference pressure. Accordingly, the dimensions of the pressure control device may likewise come to depend on the reference pressure desired in the reference pressure chamber. Fitting the pressure control device into an application such as a pipe or a package storing a product to be sprayed is thereby rendered a laborious process for a plurality of such applications where supplemental reference pressures are desired, since a large part of the components to be used need to be tailored to each other for each individual application separately. In fact, costly adaptations may be necessary per application, which eventually renders the manufacturing method for a series of applications with mutually different reference pressures expensive.

Adaptation of both the casing and the plunger part for the purpose of operatively obtaining the desired reference pressure in the reference pressure chamber entails the necessity of dimensioning these two parts in mutual adjustment. This may also have a cost-increasing effect regarding the manufacture of the pressure control device.

It is the object of the invention to provide a method which meets at least one of the above-mentioned problems. This object is achieved with a method as described in the opening paragraph hereof, which, according to the invention, is further characterized in that the method further comprises:

providing for the first and second assembly a respective first and second casing, such that the first and the second casing are substantially equal to each other; and providing for the first and second assembly a respective first and second plunger part, such that with the first plunger part, in use, in the first reference pressure chamber to be formed, the first reference pressure can be achieved in a first position of the first plunger part relative to the first casing, and with the second plunger part, in use, in the second reference pressure chamber to be formed, the second reference pressure can be achieved in a position of the second plunger part relative to the second casing when forming the first reference pressure chamber takes place in a gas with an ambient pressure which is equal to the ambient pressure of the gas in which forming the second reference pressure chamber takes place, while the first and second position each correspond to a predetermined closing position in which in the pressure control device to be used a passage between the first and the second space is closed by the respective plunger part and is cleared upon a slight movement of the respective plunger part in a direction away from the casing.

As, according to the invention, in use achieving the first reference pressure and in use achieving the second reference pressure, different from the first reference pressure, could depend only on the plunger part, it is possible for any other part of the respective assemblies, and, if desired, even any other part of the respective pressure control devices, to be kept equal. This can render the manufacture of reference pressure chambers in which, in use, different reference pressures are to prevail, much cheaper. It is possible to couple the reference pressure to be achieved in the reference pressure chamber to just one component of the reference pressure chamber, viz. the plunger part. It is moreover possible to manufacture all reference pressure chambers, and possibly all pressure control devices, at atmospheric pressure, which also contributes to the provision of a cheap manufacturing process for pressure control devices performing control on the basis of different reference pressures.

In one embodiment of a method according to the invention, the method comprises utilizing the same mold for providing a first and a second plunger part. This provides the advantage that also the manufacture of the plunger parts, independently of the reference pressure to be achieved in the reference pressure chamber to be formed therewith can be relatively cheap, since such plunger parts can for instance be manufactured with an injection molding method. In such a method, the price of the mold to a large extent determines the cost of the product to be formed with the mold. When a great many plunger parts can be manufactured using a single mold, the influence of the price of the mold on the costs of the product to be manufactured therewith can be reduced.

It is possible that a method according to the invention further comprises utilizing two plunger parts which are identical to each other at one time in the manufacturing process. Thus, it is for instance possible to manufacture a plurality of identical plunger parts by means of a single mold. As will be explained later, to be able to achieve different reference pressures, optionally, differences between the plunger parts can be provided. It is possible, for instance, to make the plunger parts of different design by means of material-removing operations.

An alterative embodiment of a method according to the invention comprises placing at least one form part and/or one-dimension part in the mold. Thus, it is for instance possible, using a single mold, first to manufacture a series of first plunger parts, and subsequently, using the same mold, to manufacture a series of second plunger parts by including a form part and/or a dimension part in the mold.

In one embodiment of a method according to the invention, the method further comprises providing the first and the second plunger part, such that the first plunger part and the second plunger part have an equal outer contour which is provided with at least one recess, wherein the dimension of the recess of the first plunger part is different from the dimension of the recess of the second plunger part and/or wherein the position at which the recess of the first plunger part is situated is different from the position at which the recess of the second plunger part is situated. Owing to the first plunger part and the second plunger part having an equal outer contour, both the first plunger part and the second plunger part are connectible to the same casing and optionally connectible to the same pressure control device. The dimension of the recess, when the at least one recess is situated in a side of the plunger part operatively proximal to the first end of the casing, can define the volume of the reference pressure chamber when the plunger part has assumed the above-mentioned closing position relative to the casing. This provides the possibility of assembling different pressure control devices, where it holds for each pressure control device that the plunger part has the same closing position relative to the casing. The casing, the pressure control device and the plunger part can, except for the recess, be identical for each pressure control device. Exclusively the size of the recess determines the eventual size of the reference pressure chamber and hence the reference pressure when the reference pressure chambers are each assembled in the same ambient pressure.

It is also possible that the recess is situated on the plunger part, such that the recess determines the closing position and hence the position of the plunger part relative to the casing in which the reference pressure in the respective reference pressure chamber is achieved. For in such a closing position, the passage between the first space in which a relatively high pressure prevails and the second space in which a relatively low pressure prevails is closed and a further going movement of the plunger part in the direction of the casing is not plausible, though not precluded in some embodiments. In this case, the at least one recess will be situated in a side of the plunger part operatively remote from the casing. Both the position and the dimension of the recess can in this case determine in what position of the plunger part relative to the casing the closing position is reached. The position of the plunger part relative to the casing eventually determines the magnitude of the volume of the reference pressure chamber and hence the reference pressure when the reference pressure chamber is assembled at an ambient pressure which is lower than the desired reference pressure. In this case, too, the casings, the pressure control devices and the plunger parts themselves, with the exception of the position and dimension of the recess, can be made of identical design.

In one embodiment of a method according to the invention, it holds that the at least one recess is situated in a side of the plunger part operatively facing the first end of the casing. For in this case it is possible, for obtaining a plurality of pressure control devices with mutually different reference pressures in the respective reference pressure chambers, to use initially identical pressure control devices with identical casings and plunger parts with identical outer contours. For obtaining the differences between the plunger parts, and hence obtaining different reference pressures in the reference pressure chambers, it is possible to reduce a recess by including volume material in the recess. It is possible that the plunger part is composed of at least two parts. It is also possible that the plunger part is composed of at least three parts. Then it preferably holds that at least one of the parts determines at least partly the dimension of the recess.

In one embodiment of a method according to the invention, it holds that the method comprises: forming the first reference pressure chamber in a gas with a first ambient pressure and forming a second reference pressure chamber in a gas with a second ambient pressure, the first ambient pressure and the second ambient pressure being equal to each other. This simplifies assembling reference pressure chambers which are each operatively provided with a gas with mutually different reference pressures.

In one embodiment of a method according to the invention, the method comprises forming at least the first reference pressure chamber or the second reference pressure chamber under an ambient pressure which is equal to the atmospheric pressure. This facilitates the method for forming at least the first reference pressure chamber or the second reference pressure chamber.

Figure 5:
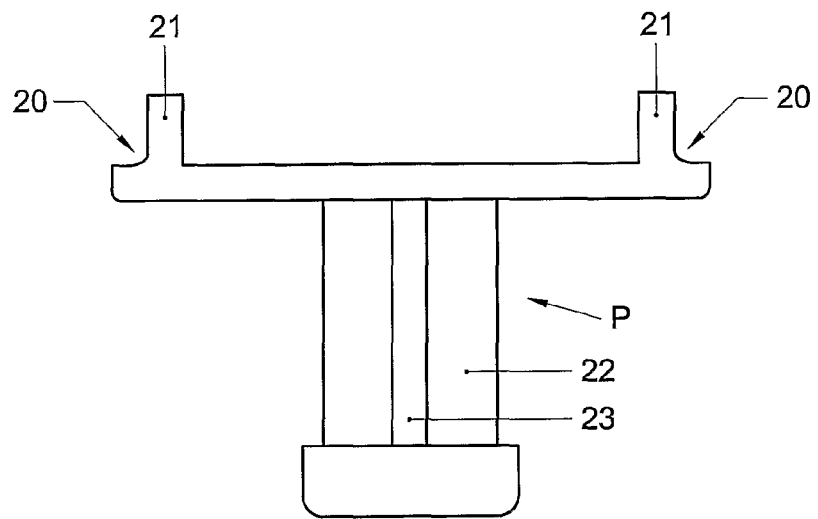
Figure 6:
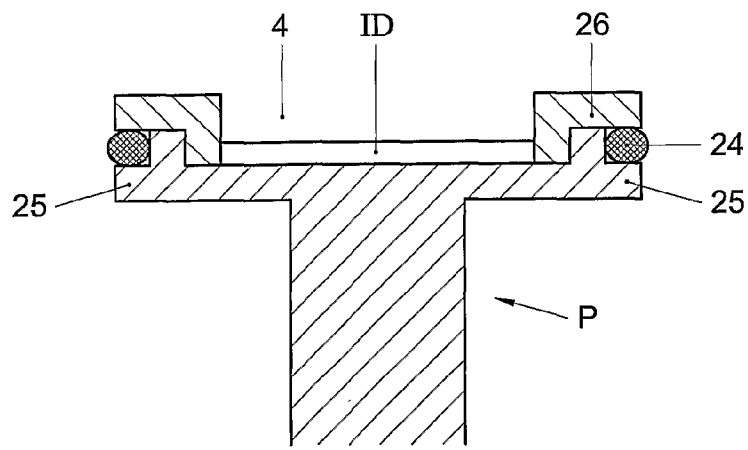
Figure 7B:
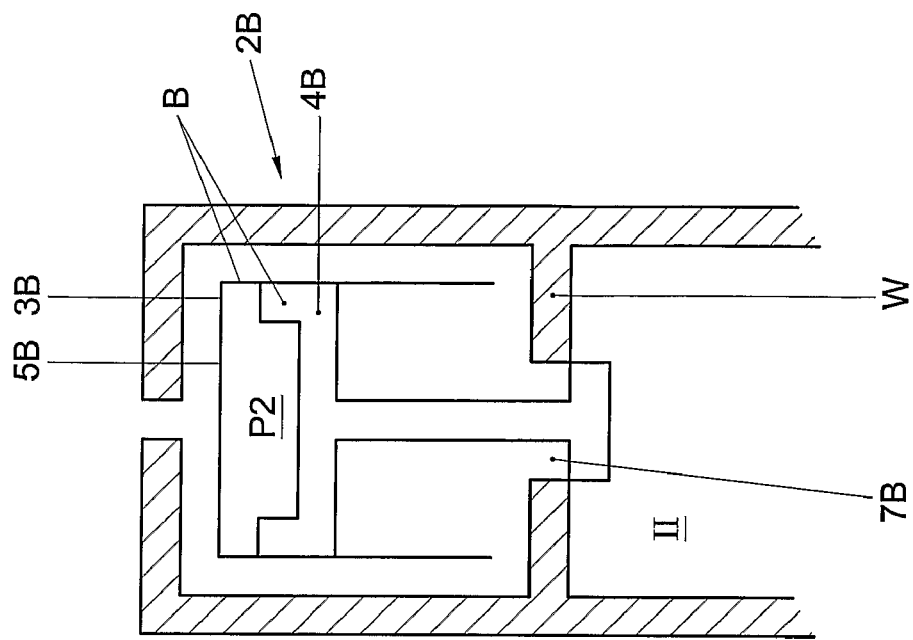
Figure 7A:
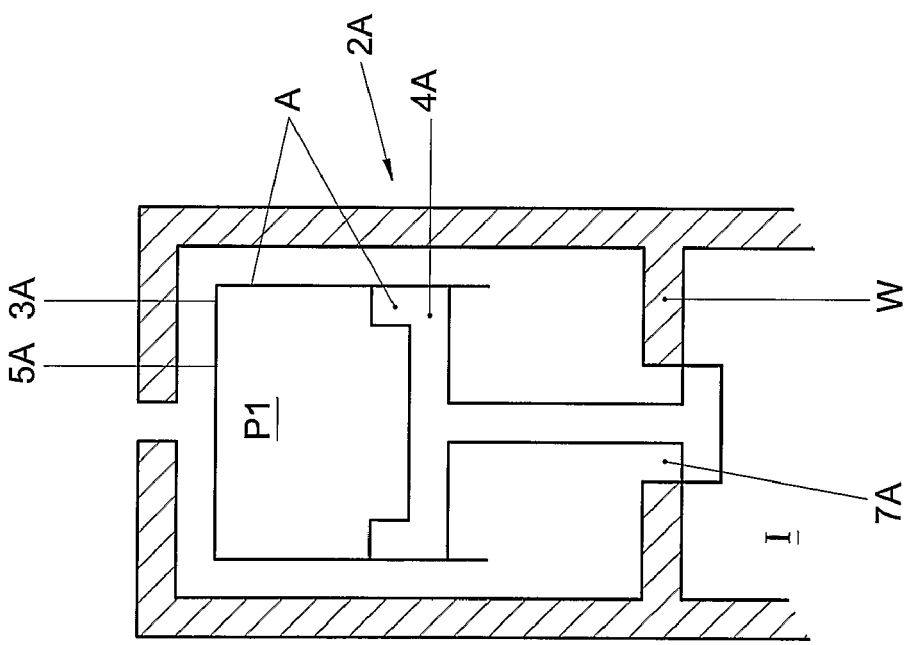

The invention will presently be further elucidated with reference to a drawing, wherein:

FIG. 1a schematically shows a first reference pressure chamber according to a first embodiment of a method according to the invention;

FIG. 1b schematically shows a second reference pressure chamber according to the first embodiment of a method according to the invention;

FIG. 1c schematically shows an outer contour of each of the plunger parts shown in FIGS. 1a and 1b;

FIG. 2a schematically shows a first reference pressure chamber according to a second embodiment of a method according to the invention;

FIG. 2b schematically shows a second reference pressure chamber according to a second embodiment of a method according to the invention;

FIG. 3a schematically shows a first reference pressure chamber according to a third embodiment of a method according to the invention;

FIG. 3b schematically shows a second reference pressure chamber according to the third embodiment of a method according to the invention;

FIG. 4a schematically shows a first reference pressure chamber according to a fourth embodiment of a method according to the invention;

FIG. 4b schematically shows a second reference pressure chamber according to the fourth embodiment of a method according to the invention;

FIG. 5 schematically shows an example of a plunger part according to a fifth embodiment of a method according to the invention;

FIG. 6 schematically shows an example of a plunger part according to a sixth embodiment of a method according to the invention;

FIG. 7a schematically shows a part of a first pressure control device according to a seventh embodiment of a method according to the invention;

FIG. 7b schematically shows a part of a second pressure control device according to the seventh embodiment of a method according to the invention.

In the drawing, equal parts have equal reference characters.

FIG. 1a shows the product of a method for providing a first assembly A for manufacturing a first reference pressure chamber 1A which in use in a pressure control device 2A encloses a gas such that the gas is held under a first reference pressure P1. FIG. 1b shows the product of a method for providing a second assembly B for manufacturing a second reference pressure chamber 1B which in use in a pressure control device 2B encloses the gas such that the gas is held under a second reference pressure P2. The first reference pressure P1 differs from the second reference pressure P2. The pressure control devices shown are each suitable for feeding through, on the basis of the respective reference pressure prevailing in the reference pressure chamber, a fluid from a first space I in which a relatively high pressure prevails to a second space II in which a relatively low pressure prevails. The method which has generated the assemblies A, B shown in FIGS. 1a and 1b comprises providing the first and the second assembly A, B such that each assembly A, B for forming the respective reference pressure chamber 1A, 1B comprises a casing 3A, 3B and a plunger part 4A, 4B. Each casing 3A, 3B is closed at a first end 5A, 5B. As shown, the plunger part can at least partly be connected to the casing 3A, 3B in or adjacent a second end 6A, 6B of the respective casing 3A, 3B and is then movable relative to the casing. For each assembly A, B, it holds that when a position of the respective plunger part 4A, 4B relative to the respective casing 3A, 3B has been reached, in use, in the respective pressure control device 2A, 2B a passage 7A, 7B between the first and the second space I, II is closed. Upon a slight movement of the plunger part 4A, 4B in a direction away from the casing 3A, 3B, the passage 7A, 7B is cleared. It will be clear that in the condition shown in FIGS. 1a and 1b, the passage 7A, 7B between the first and the second space I, II is closed. In other words, for the assemblies A, B shown in FIGS. 1a and 1b, it holds that the plunger parts 4A, 4B are each situated in a closing position. The method for providing assemblies A, B shown in FIGS. 1a and 1b comprises providing for the first and second assembly A, B a respective first and second casing 3A, 3B, such that the first and the second casing 3A, 3B, as schematically shown are substantially equal to each other. Furthermore, such a method comprises providing for the first and the second assembly A, B a respective first and second plunger part 4A, 4B, such that with the first plunger part in use in the first reference pressure chamber 1A to be formed the first reference pressure can be achieved at a predetermined first position of the first plunger part relative to the first casing, and with the second plunger part 4B in use in the second reference pressure chamber 1B to be formed the second reference pressure can be achieved at a predetermined second position when forming the first reference pressure chamber 1A takes place in a gas with an ambient pressure which is equal to the ambient pressure of the gas in which forming the second reference pressure chamber 1B takes place. The first and second position each correspond to the closing position.

As indicated hereinabove, the method comprises providing a respective first and second casing 3A, 3B which are substantially equal to each other. The casings 3A, 3B should be equal to each other, such that when identical plunger parts are used for forming the reference pressure chambers 1A, 1B with the aid of the casings 3A, 3B, and a use of these assemblies takes place in identical pressure controllers, the reference pressures to be reached in the reference pressure chambers are equal to each other when forming the first reference pressure chamber has taken place in a gas having an ambient pressure which is equal to the ambient pressure of the gas in which forming a second reference pressure chamber has taken place. In practice, it is possible for the casings 3A, 3B to be made of identical and cup-shaped design. The material of which the casing is manufactured is airtight and preferably very thin for the purpose of the compactness of the pressure control device to be formed. It is possible for the casings to be formed from aluminum.

As is to be derived from FIGS. 1a and 1b, a method with which such assemblies are obtained can further comprise: providing the first and the second plunger part 4A, 4B, such that the first plunger part 4A and the second plunger part 4B have an equal outer contour which is provided with at least one recess 8A, 8B. In the plunger parts 4A, 4B shown in FIGS. 1a and 1b, the recess is situated in a side of the plunger part 4A, 4B facing the first end 5A, 5B of the casing 3A, 3B. The dimension of the recess 8A of the first plunger part 4A is different from the dimension of the recess 8B of the second plunger part 4B. For clarity, FIG. 1c shows the outer contour BC of each of the plunger parts 4A, 4B. A recess U is indicated in dotted lines.

The method for manufacturing such assemblies can comprise: utilizing two plunger parts which at one time in the manufacturing process are identical to each other. Thus, it is possible that the recess 8B originally had the same dimensions as the recess 8A. In that case, the plunger parts 4A, 4B are identical to each other. It is possible that afterwards, though before the formation of the reference pressure chamber 1B, one or more fitting parts 9B, 10B are included in the recess 8B, thereby making the dimension of the recess 8B different from the dimension of the recess 8A.

The plunger parts 4A, 4B can each be manufactured from plastic. It is possible to manufacture the plunger parts 4A, 4B using the same mold. This obviously provides enormous advantages for producing reference pressure chambers in which different reference pressures are to prevail, while the different reference pressure chambers are to be manufactured as cheaply as possible. In fact, all parts that are needed for manufacturing the first reference pressure chamber 1A can be used for the second reference pressure chamber 1B as well. Only a few very cheap and simple additions, such as, for instance, fitting parts 9B and/or 10B, are to be used to enable a different reference pressure to prevail in the reference pressure chamber 1B than in the reference pressure chamber 1A when both reference pressure chambers are formed in a gas having the same ambient pressure.

It is also possible that both plunger parts are manufactured in the same mold, but in the formation of the first plunger part 4A for instance a form part and/or a dimension part is used, whereas no form part and/or dimension part is used in the formation of plunger part 4B in the same mold. It is naturally also possible to use the form parts and/or dimension parts in the formation of both plunger parts 4A, 4B while the form parts and/or dimension parts for forming the first plunger part are different from those for forming the second plunger part. The use of form parts and/or dimension parts in a mold can further be optimized by the skilled person using routine calculation and/or experiments.

It is possible that at least one of the two plunger parts 4A, 4B is composed of at least two parts. Thus, a first part can comprise a piston part 11A, 11B having a stem 12A, 12B attached thereto. A second part can comprise a rubber O-ring 13A, 13B which is part of the plunger part 4A, 4B such that, in use, upon sliding movement of the plunger part 4A, 4B, the O-ring 13A, 13B slides along and thereby preserves a closure between the plunger part 4A, 4B and the casing 3A, 3B, so that no gas can leak from the reference pressure chamber 1A, 1B. It is also possible, however, that the plunger part 4A, 4B is of one-part construction and has been designed with the aid of a two-component injection-molding process, such that the core is manufactured from a relatively hard plastic and an outer side is manufactured from a rubber, so that an O-ring is not needed anymore.

The plunger parts 4A, 4B can also be composed of two parts when a provision operatively defining the closing position is not arranged until after the reference pressure chamber has been formed and included in a pressure control device. Thus, a shutoff 14A, 14B can be attached to the stem 12A, 12B as part of the plunger part 4A, 4B, by means of a fastening mechanism suitable for the purpose, such as, for instance, a screw thread mechanism.

It is also possible to regard the plunger part 4A as shown in FIG. 1a as one-part in design and hence to regard the plunger part 4A provided with part 9B as two-part in design and to regard it as three-part in design in case plunger part 4B is provided with parts 9B and 10B. It is clear that the parts 9B, 10B determine the dimension of the recess 8B.

In FIGS. 1a to 4b, the reference chambers 1A, 1B formed with the aid of the plunger parts 4A, 4B and casings 3A, 3B are schematically represented in a pressure control device 2A, 2B. In this schematic representation, the first space I, in which, in use, a fluid is held under a relatively high pressure, is separated from the second space II, in which the fluid is held under a relatively low pressure, by means of a wall W which includes the passage 7A, 7B. The first space I can for instance comprise a storage space for propellant or a storage space for a product to be sprayed. The first space I can also comprise a pipe section situated upstream of the pressure control device. The second space II is normally in open communication with a downstream part—with respect to the pressure control device—of for instance a pipe in which gases are conveyed, an outlet channel of an aerosol can, or something in that nature. The dotted line drawn in FIGS. 1a and 1b indicates how the gas, or in some cases the liquid, flows on from the first space I through the second space II. It is stressed that this is merely an example, which is moreover represented schematically. Many variants are possible. It will also be clear that in FIGS. 1a to 4b the plunger parts are represented in the closing position. The dotted lines drawn in FIGS. 1a and 1b obviously reflect a possible path of the fluid to be fed through the pressure control device when the respective plunger part makes a slight movement from the closing position in a direction away from the respective casing.

The pressure control devices shown in FIGS. 1a to 4b work, briefly formulated, as follows. When the pressure in the respective reference pressure chamber 1A, 1B is higher than the pressure in the respective second space II, the respective plunger part 4A, 4B will perform a slight movement away from the respective casing 3A, 3B that is away from the respective first end 5A, 5B of the respective casing 3A, 3B. As a result, the respective passage 7A, 7B will be cleared for passage of the fluid from the respective first space I to the respective second space II. When the pressure in the respective second space II is higher than the reference pressure in the reference pressure chamber 1A, 1B, the respective plunger part 4A, 4B will move in a direction of the respective first end 5A, 5B of the respective casing 3A, 3B. As a result, the respective passage 7A, 7B will be closed again, disallowing passage of the fluid from the respective first space I to the respective second space II.

It is possible that the reference pressure in the respective reference pressure chamber 1A, 1B is achieved as follows. At an ambient pressure lower than the desired reference pressure to be achieved, the respective plunger part is "connected" with the respective casing. In the embodiments shown, "connecting" comprises introducing the respective plunger part into a respective casing, such that the respective plunger part and the respective casing enclose a gas with the ambient pressure and the respective plunger part is movable relative to the respective casing without gas being able to escape from the then obtained reference pressure chamber. In other embodiments, a different manner of connecting the respective plunger part with the respective casing can be possible. When the obtained reference pressure chamber is introduced into the respective pressure control device, or the respective pressure control device is arranged around the obtained reference pressure chamber, which is to say, for instance, that for instance the respective stem 12A, 12B extends through the passage 7A, 7B into the respective first space I and the respective shutoff 14A, 14B is arranged, then upon presentation of the fluid with the high pressure in the respective first space I, the respective plunger part will be moved by this high pressure in the direction of the first end of the respective casing until the closing position is reached. For in the closing position, the passage from the first space I to the second space II is closed. When the plunger part, with respect to the casing, has arrived in such a position and the closing position has been reached, the reference pressure prevails in the reference pressure chamber. When subsequently the pressure in the second space II falls below the reference pressure, then, as a result of a response of the respective plunger part, the passage will be opened again, etc. It is noted that it is therefore possible that the reference pressure is only reached in the reference pressure chamber when a fluid of a high pressure is presented to the pressure control device for the first time. This provides the advantage that the reference pressure chamber will not necessarily enclose a gas of a relatively high pressure from the time of forming the reference pressure chamber, and hence that the chance of leakage of gas from the reference pressure chamber is less emphatically present during that period compared with a period in which the reference pressure does prevail in the reference pressure chamber. Hereinbelow, it will be specified in more detail that with a particular embodiment of a method according to the invention, advantageous use can be made of this phenomenon.

FIGS. 2a and 2b show products of an embodiment of a method according to the invention in which the first and the second plunger part 4A, 4B are each provided with a provision which, in use, determines the closing position, while it holds that a position of this provision and/or a dimension of this provision is different in the first plunger part 4A than in the second plunger part 4B. In this case, the provision defines a recess 15A, 15B.

An embodiment of the method according to the invention whereby the plunger parts 4A, 4B shown in FIGS. 3a and 3b are provided, comprises providing the plunger parts 4A, 4B, such that the plunger parts 4A, 4B have an equal outer contour which is provided with at least one recess 15A, 15B. The position where the recess 15A of the plunger part 4A represented in FIG. 2a is situated differs from the position where the recess 15B of the plunger part 4B represented in FIG. 2b is situated.

The products of an alternative embodiment of a method according to the invention are shown in FIGS. 3a and 3b. The method which has yielded these products comprises providing the plunger parts 4A, 4B, such that the plunger parts 4A, 4B have an equal outer contour which is likewise provided with at least one recess 16A, 16B. The dimension of the recess 16A of the plunger part 4A is different from the dimension of the recess 16B of the plunger part 4B.

For FIGS. 2a to 3b, it holds that the recess is situated in a side of that plunger part which, in use, is remote from the casing.

For FIGS. 2a and 2b, it holds that the first plunger part 4A and the second plunger part 4B are the same except for the position of the provision, in the case the recess 15A, 15B.

For the products of a method according to the invention as shown in FIGS. 3a and 3b, it holds that the first plunger part 4A and the second plunger part 4B are the same except for the dimension of the provision, in this case the recess 16A, 16B.

Furthermore, it holds for the plunger parts shown in FIGS. 2a to 3b that each plunger part comprises a stem 2A, 2B on which the provision is situated. Instead of, or in addition to, stating that the provision comprises a recess, it could also be stated that the provision operatively determining the closing position comprises a closing surface. In FIGS. 4a and 4b, such a closing surface is formed by a rubber O-ring which, in FIG. 4a, is arranged at positions of the plunger part 4A to provide closure with respect to a wall or inner wall of the passage 7A for closing this passage. In FIG. 4b, an O-ring is arranged on an edge and/or inner wall of the passage 7B. Accordingly, the closing surface is formed by parts of the plunger part 4B.

Naturally, it is possible that combinations of the above-described embodiments of a method according to the invention lead to plunger parts which differ both in a side of the plunger part operatively proximal to the first end of the casing and in a side of the plunger part operatively remote from the casing. Thus, for instance, parts 9B and 10B as shown in FIG. 1b can be used, but also recesses 15A, 15B or recesses 16A, 16B, as shown in FIGS. 2a to 3b.

FIG. 5 shows a plunger part P which can be used in an embodiment of a method according to the invention. At the positions 20, an O-ring can be arranged around the upstanding wall 21. There is no necessity for further confinement of the O-ring in an annular enclosure. Provided in the stem 22 is a slot 23 extending in the axial direction of the stem 22. In this slot 23, optionally a clamping part (not shown) can be clamped, for forming a recess based on a part of the slot not filled up with a clamping part. Through the position of the clamping part, the position of the recess can be defined. Through the size of the clamping part, the size of the recess can be defined.

FIG. 6 shows a part of a plunger part which can be used in an embodiment of a method according to the invention. In this case, the O-ring 24 is further confined by a collar 25 of the plunger part P, an upstanding edge 21 of the plunger part P, and an L-shaped ring 26 which can be clamped within the upstanding edge 20, closed upon itself. It is also possible for the part 26 to be connected with the plunger P by means of a welded joint or, for instance, a glued joint. The size of the recess U can also be defined by utilizing one or more insert parts ID. FIG. 6 does not further show the part of the stem operatively remote from the casing.

The reference pressure chambers shown in FIGS. 1a-4a are each included in a same type of pressure control device. The casings are equal to each other and the plunger parts differ from each other.

Other products of an embodiment of a method according to the invention are shown in FIGS. 7a and 7b. What holds here is that the casings 3A and 3B and the plunger parts 4A and 4B are equal to each other. The different reference pressures can be achieved in this example in that the method comprises: placing the first assembly A in a first pressure control device 1A and placing a second assembly B in a second pressure control device 1B, while the passage and/or the position relative to the respective casing thereof of the first pressure control device is designed differently with respect to the passage in the second pressure control device, such that upon assembly of the first reference pressure chamber and the second reference pressure chamber in a gas with the same ambient pressure and on the basis of two equal plungers and two equal casings, a reference pressure prevailing in the first chamber will differ in use from a reference pressure prevailing in the second chamber.

Preferably, an embodiment of a method according to the invention comprising manufacturing a plurality of reference pressure chambers filled with a gas, which are each applicable for use as part of a pressure control device. For each reference pressure chamber of a plurality of reference pressure chambers, it holds that the reference pressure to be obtained therein is different from the reference pressure which is to be obtained in any other reference pressure chamber. In other words, the invention is not limited to a method whereby only two pressure control devices are formed which differ only in reference pressure. It is possible to produce a great multiplicity of pressure control devices that are virtually identical except for the reference pressure by causing the respective plunger parts to differ slightly from each other. One embodiment of a method according to the invention can comprise forming the first reference pressure chamber in a gas with a first ambient pressure and forming the second reference pressure chamber in a gas with a second ambient pressure, the first ambient pressure and the second ambient pressure being equal to each other. In such a method, it is very well possible, on the basis of the differences in the respective plunger parts, to accurately predetermine the mutual differences in the reference pressure.

It is well possible for an embodiment of a method according to the invention to comprise: forming at least the first reference pressure chamber or the second reference pressure chamber under an ambient pressure which is equal to the atmospheric pressure. In this case, there is no need to make further use of equipment to adjust the pressure under which the method is carried out.

As already stated earlier, the method can comprise: forming the first and second pressure control device, such that the first reference pressure prevails in the first reference pressure chamber and the second reference pressure prevails in the second reference pressure chamber. The first and the second pressure control device can each be included in a pressurized package from which, by means of a pressure control device, a fluid stored under a relatively high pressure, can be released with a relatively low pressure.

It is also possible, however, that at least one of the first and the second pressure control device is included in a pipeline in which, by means of a pressure control device, a fluid being under a relatively high pressure can be fed through with a relatively low pressure from a position situated upstream with respect to the pressure control device to a position situated downstream with respect to the pressure control device.

The method is not limited to embodiments described hereinabove by way of example.

Thus, for the purpose of limiting the volume of the reference pressure chamber, it is for instance possible, instead of using a recess in a side of the plunger part operatively facing the first end of the casing, to use a filling part operatively taking up volume in the reference pressure chamber and thereby defining the reference pressure to be defined. For it is the closing position that defines the position of the plunger part with respect to the casing and it is the size of the reference pressure chamber achieved at that position that defines the reference pressure. The filling part can optionally be included in the reference pressure chamber without being connected with the plunger part. However, such a situation is also regarded as a product of an embodiment of a method according to the invention, since in that case the filling part is associated with the plunger part and, like the plunger part, movable with respect to the casing. In other words, the filling part is considered to be a part of the plunger part.

It is possible that a method according to the invention further comprises: fitting a shutoff which is openable, such that the fluid of high pressure as stored in the first space is only presented to the pressure controller when the openable shutoff has been placed in a "high-pressure fluid releasing" position. Here, use is made of the earlier-mentioned phenomenon entailing a lesser chance of leakage of gas from the reference pressure chamber before the reference pressure has been provided. This is beneficial to the so-called shelf-life of the reference pressure chamber. An example of such an openable shutoff is described in NL 1022455.

Furthermore, it is noted that the closing mechanism with which the passage is closed can be designed differently than shown. For instance, instead of the wall part of the wall W remote from the casing, the wall part of wall W proximal to the casing could for the purpose of closure be covered by for instance a plate. In that case, an inversion mechanism will have to be applied, such that the direction of movement of the piston and the direction of movement of the covering plate can be opposite. Specifically in that case, instead of a stem, a covering membrane can be used.

Such variants are each understood to fall within the framework of the invention.

The invention claimed is:

1. A method for manufacturing at least a first pressure control device and a second pressure control device, wherein the first pressure control device comprises a first reference pressure chamber and the second pressure control device comprises a second reference pressure chamber, the method comprising:

manufacturing first and second casings such that the first and the second casings are substantially identical to each other and that each casing has a closed end and an open end;

manufacturing first and second plunger parts such that the first plunger part and the second plunger part have an equal outer contour which is provided with at least one recess, wherein the dimension of the recess of the first plunger part is different from the dimension of the recess of the second plunger part and/or wherein the position where the recess of the first plunger part is situated is different from the position where the recess of the second plunger part is situated, assembling the first plunger part and the first casing to form the first reference pressure chamber in a gas having a first ambient pressure, wherein the first reference pressure chamber encloses the gas under a first reference pressure, and the first reference pressure is achieved in a first position of the first plunger part relative to the first casing, and assembling the second plunger part and the second casing to form the second reference pressure chamber in the gas having a second ambient pressure equal to the first ambient pressure, wherein the second reference pressure chamber encloses the gas under a second reference pressure different from the first reference pressure, and the second reference pressure is achieved in a second position of the second plunger relative to the second casing, wherein the respective pressure control device is configured to feed, on the basis of the first or the second reference pressure, a gas or fluid from a first space to a second space having a pressure lower than that of the first space, and each of the first and second positions corresponds to a predetermined closing position defined in the respective pressure control device such that a passage between the first and the second space is closed by the respective plunger part, whereas the passage is cleared upon a movement of the respective plunger part in a direction away from the closed end of the casing.

2. The method according to claim 1, wherein the first and second plunger parts are substantially identical to each other.

3. The method according to claim 1, wherein the first plunger part differs from the second plunger part.

4. The method according to claim 3, wherein the method further comprises forming the first plunger part in a mold and forming the second plunger part in the same mold.

5. The method according to claim 4, wherein the method further comprises placing at least one form part and/or dimension part in the mold.

6. The method according to claim 3, wherein the first and second plunger parts are identical to each other at one moment in time in the manufacturing process.

7. The method according to claim 3, wherein the at least one recess is situated in a side of the first or second plunger part proximal to the closed end of the first or second casing.

8. The method according to claim 7, wherein the first or second plunger part is composed of at least two parts.

9. The method according to claim 8, wherein the first or second plunger part is composed of at least three parts.

10. The method according to claim 8, wherein at least one of the parts in the first or second plunger part determines at least partly the dimension of the recess.

11. The method according to claim 3, wherein the at least one recess is situated in a side of the first or second plunger part remote from the first or second casing.

12. The method according to claim 3, wherein the first and the second plunger parts are each provided with a provision which, in use, determines the first or second predetermined closing position, wherein a position of this provision and/or a dimension of this provision is different in the first plunger part than in the second plunger part.

13. The method according to claim 12, wherein the first plunger part and the second plunger part are the same except for the position and/or dimension of the provision in each of the first and second plunger parts.

14. The method according to claim 12, wherein the first plunger part and the second plunger part each comprise a stem on which the provision is situated.

15. The method according to claim 12, wherein the provision comprises a closing surface.

16. The method according claim 1, wherein the method further comprises manufacturing a plurality of reference pressure chambers filled with the gas, which are each applicable for use as part of a pressure control device wherein each reference pressure chamber has a reference pressure different from the reference pressure in any other reference pressure chamber.

17. The method according to claim 1, wherein the first and second ambient pressures are equal to the atmospheric pressure.

* * * * *